United States Patent [19]
Sawdon

[11] Patent Number: 5,431,089
[45] Date of Patent: Jul. 11, 1995

[54] FORCE GENERATING MECHANISM

[75] Inventor: Edwin G. Sawdon, St. Clair, Mich.

[73] Assignee: BTM Corporation, Marysville, Mich.

[21] Appl. No.: 246,575

[22] Filed: May 20, 1994

Related U.S. Application Data

[63] Continuation of Ser. No. 32,020, Mar. 16, 1993, abandoned.

[51] Int. Cl.6 ............................................. F01B 19/02
[52] U.S. Cl. ............................................ 92/90; 92/89
[58] Field of Search ........................ 92/89, 90, 91, 92

[56] References Cited

U.S. PATENT DOCUMENTS

| | | | |
|---|---|---|---|
| 345,446 | 7/1886 | Powers | 92/89 |
| 2,617,260 | 11/1952 | Baldwin | 92/89 |
| 4,159,634 | 7/1979 | Stengard . | |
| 4,543,877 | 10/1985 | Emmert | 92/90 |
| 4,757,609 | 7/1988 | Sawdon . | |
| 4,878,284 | 11/1989 | Sawdon . | |
| 4,910,853 | 3/1990 | Sawdon . | |
| 4,934,173 | 7/1990 | Bakermans et al. . | |
| 5,027,503 | 7/1991 | Sawdon . | |

Primary Examiner—F. Daniel Lopez
Attorney, Agent, or Firm—Harness, Dickey & Pierce

[57] ABSTRACT

Disclosed is a unique force generating mechanism which is easily adapted for use in a compact lightweight tool requiring high work forces. The mechanism includes a force generating member disposed within an actuation chamber where either pneumatic or hydraulic fluid pressure is allowed to bear against a relatively large ram surface causing a deflection of the ram in a first direction and translation of the ends of the ram in a second direction substantially perpendicular to the first direction. A working force, larger than the force of the fluid bearing on the ram surface, is thereby generated along this direction of translation.

13 Claims, 3 Drawing Sheets

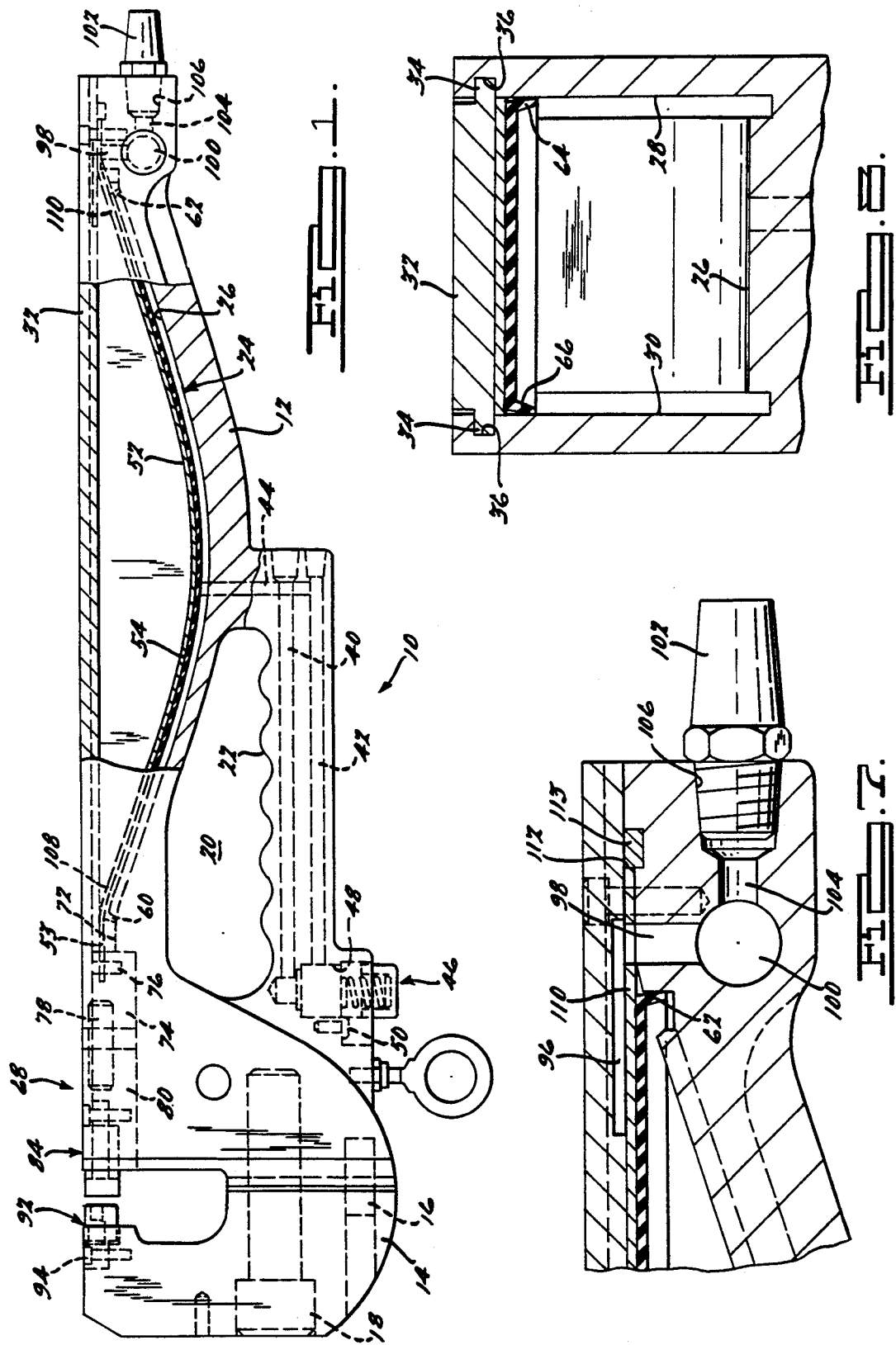

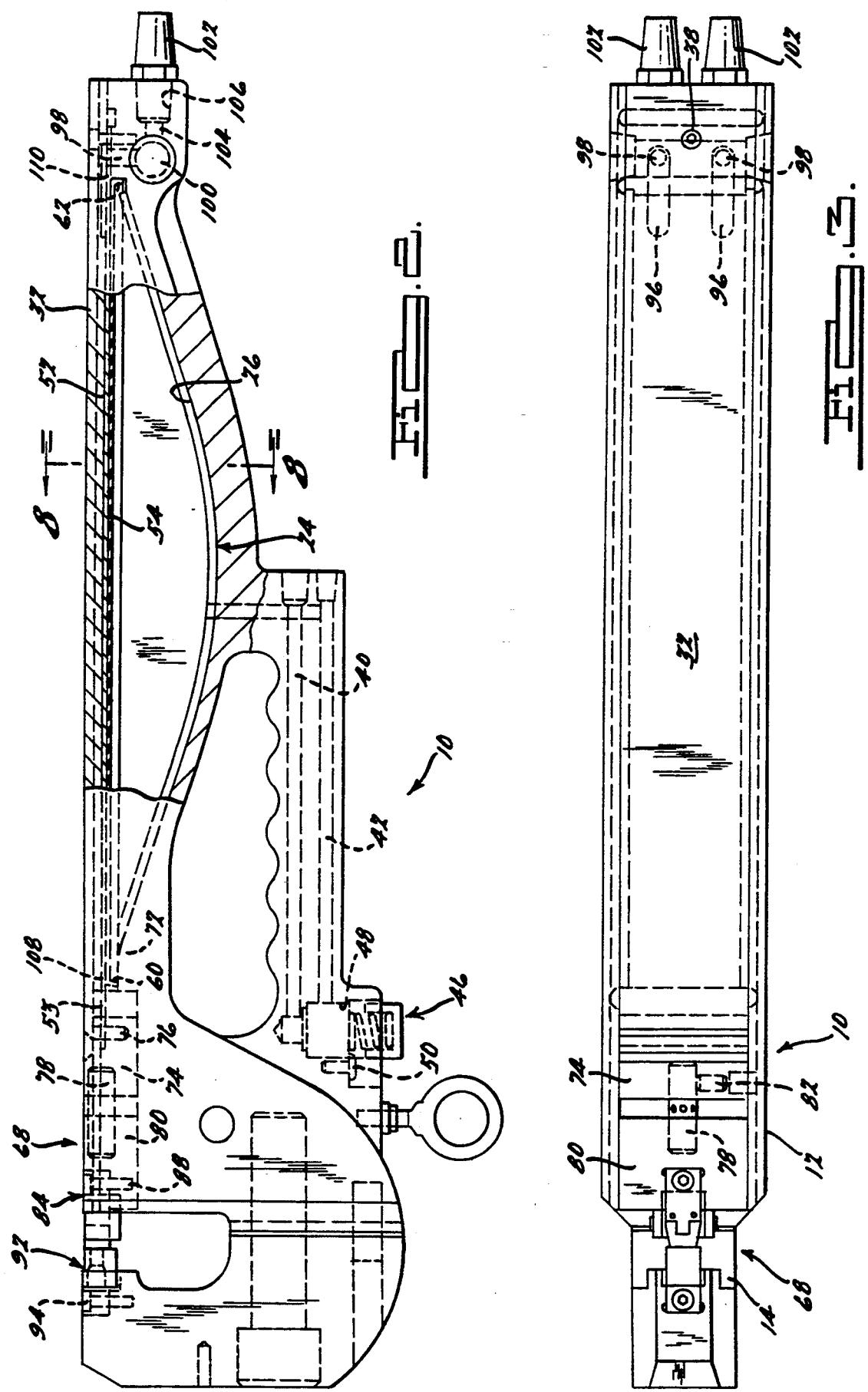

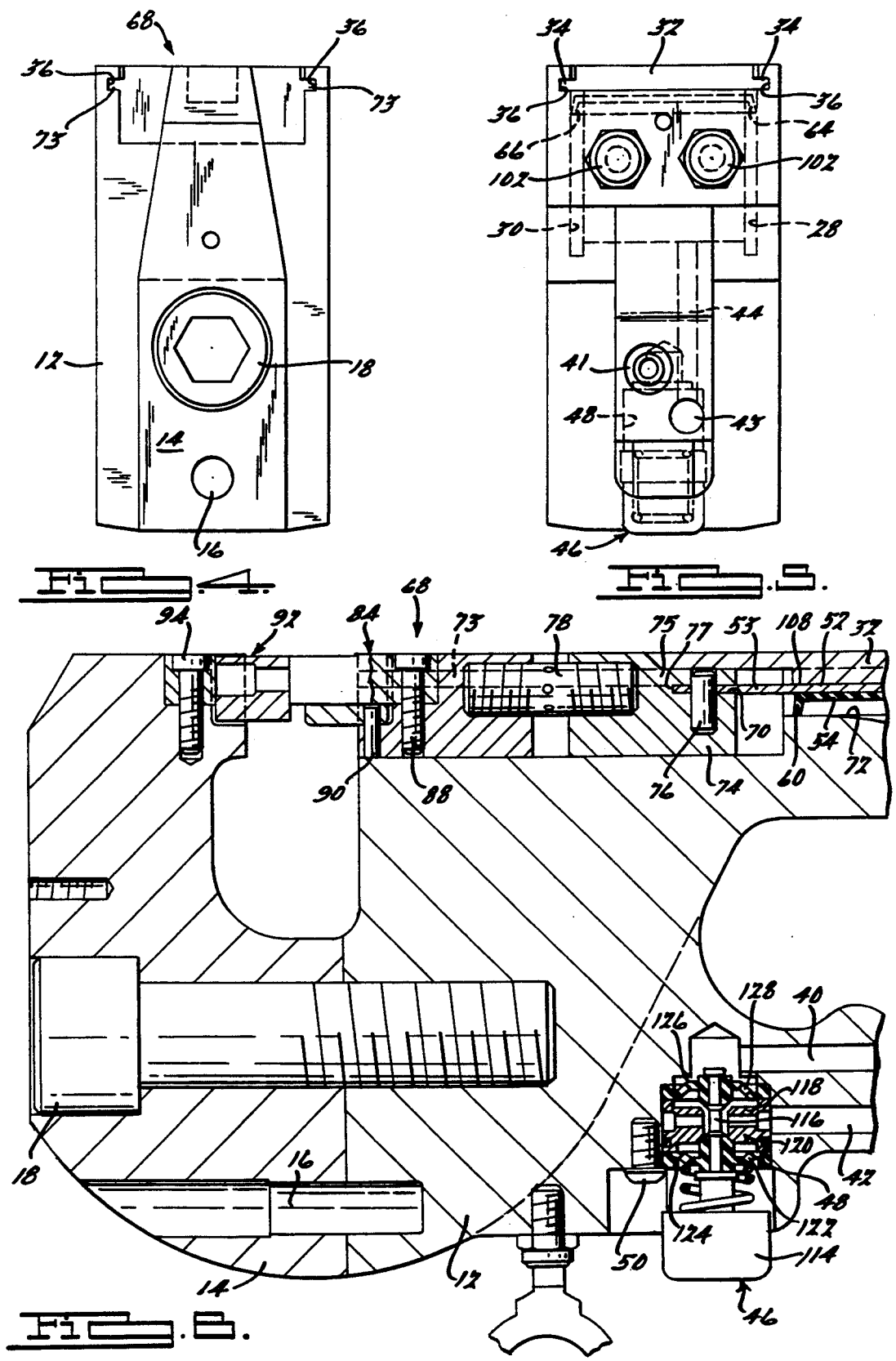

FORCE GENERATING MECHANISM

This is a continuation of U.S. patent application Ser. No. 08/032,020, filed Mar. 16, 1993, which has been expressly abandoned.

BACKGROUND AND SUMMARY OF THE INVENTION

This invention relates generally to sheet material forming devices and more specifically to a portable sheet material forming tool incorporating a unique force generating mechanism.

In the manufacture of products there is often the need to join several pieces of sheet material to build various assemblies and subassemblies. In this regard, there are many different means for accomplishing this joining task. For example, there is adhesive bonding, welding or cold deformation. In cold deformation, several pieces of sheet material are plastically deformed in such a manner that they are locked together. Depending on the thickness, strength, and/or the number of pieces of material to be joined, a great amount of force is required to accomplish this plastic deformation.

An apparatus and method for accomplishing cold forming joining of sheet material is disclosed in commonly assigned U.S. Pat. Nos. 5,027,503, 4,910,853, 4,757,609, the disclosures of which are hereby expressly incorporated herein by reference. As is disclosed in these patents, the sheets of material to be joined are placed between complementary die members. A suitable press is then activated to provide the force and displacement necessary to deform the material between the die members thereby joining the sheets of material together. This process has a number of advantages over such joining processes as resistance/spot welding and bonding which are more fully discussed in the above referenced patents.

In the embodiments disclosed in the above U.S. patents, the dies are generally attached to relatively large presses thus requiring the sheets to be joined to be manipulated with respect to the press. In contrast, portable spot welding devices have been in existence for many years. These smaller devices allow for the joining tool to be manipulated with respect to the workpiece thereby making it easier to work with large workpieces. Smaller portable tools are available which can provide the necessary clamping force to join the sheets and which allow for manipulation of the joining tool with respect to the workpiece and thus allow for easier operations with larger workpieces. One such tool is disclosed in commonly assigned U.S. Pat. No. 4,878,284, the disclosure of which is hereby expressly incorporated by reference herein. These tools generally incorporate a pneumatic or hydraulic cylinder to provide the force and displacement necessary for sheet material joining and clamping. Unfortunately, the levels of force generated by these devices is limited by the size of the cylinder which can be incorporated into the tool while still maintaining the compact, light weight nature of a hand held portable tool.

Accordingly, the present invention is uniquely adapted to provide the force necessary for sheet material joining in a compact, lightweight tool. In the present invention, a force generating member, a resilient ram, is disposed within an actuation chamber where either pneumatic or hydraulic fluid pressure is allowed to bear against the relatively large ram surface causing a deflection of the ram in a first direction and translation of an end of the ram in a second direction substantially perpendicular to the first direction. A working force, larger than the force of the fluid bearing on the ram surface, is thereby generated along this direction of translation.

Another advantage of the present invention is that it provides for generating large amounts of working or clamping force within a relatively small, light weight tool.

Still another advantage of the present invention is that it is readily adaptable to a number of different applications including sheet material joining, clamping, or resistance/spot welding or any other force-requiring applications.

Additional advantages and features of the present invention will become apparent from the subsequent description and the subjoined claims taken in conjunction with the accompanying drawings.

BRIEF DESCRIPTION OF THE DRAWINGS

FIG. 1 is a side elevational view of the sheet material joining tool of the present invention shown partly in section;

FIG. 2 is a view similar to the view in FIG. 1, with the force generating mechanism actuated;

FIG. 3 is a top plan view of the tool;

FIG. 4 is an end elevational view of the tool;

FIG. 5 is an elevational view of the opposite end of the tool;

FIG. 6 is an enlarged vertical sectional view of the head portion of the tool showing the connection of the force generating member with the sheet material joining die;

FIG. 7 is an enlarged vertical sectional view of the tail portion of the tool; and FIG. 8 is sectional view taken along line 8—8 of FIG. 2.

DETAILED DESCRIPTION OF THE PREFERRED EMBODIMENTS

The present invention is described for illustrative purposes embodied in a pneumatically actuated hand held portable sheet material forming tool. It will be appreciated, however, that the principles of the present invention are readily adaptable to a number of manufacturing processes which involve force generation, clamping, piercing and holding.

Referring then to the drawings and more particularly to FIG. 1, there is shown a sheet material joining tool 10 having a body 12 and an anvil 14 which is located and secured to body 12 by dowel 16 and screw 18 (FIG. 4). Body 12 has formed therein an enlarged transverse opening 20 with a contoured surface 22 defining a hand grip. Body 12 also defines an actuating chamber 24 having a generally arcuate upper surface 26 and relatively flat side surfaces 28 and 30 (FIG. 8). As is best seen in FIGS. 5 and 8, a cover 32 has a pair of outwardly extending ribs 34 which are received in complementary grooves 36 formed near the lower portions of side surfaces 28 and 30. Cover 32 encloses the actuating chamber 24 and defines an essentially flat limiting surface against which the ram 52 will come to bear during operation of the forming tool. Cover 32 is retained in place to body 12 by screw 38.

With reference once again to FIG. 1, formed in the upper portion of body 12 above the contoured surface 22 are two substantially parallel bores 40 and 42. A third bore 44, generally perpendicular to bores 40 and 42 provide fluid communication between bore 42 and actuating chamber 24. Actuating fluid is supplied via bore 40 to valve 46. Valve 46 is positioned within a bore 48 formed in the upper surface of body 12 and which is in fluid communication with bores 40 and 42. Valve 46 (shown depressed in FIG. 6) is operable to control the flow from a source of pressurized fluid (not shown) via bores 40, 42 and 44 into the actuating chamber for actuating the sheet material joining tool. Fitting 41 provides connection of bore 40 with the source of pressurized fluid, and plug 43 seals the end of bore 42 thus directing pressurized fluid into chamber 24. In the preferred embodiment, valve 46 is a three way poppet valve, and is retained in bore 48 by screw 50.

Disposed within actuating chamber 24 is a ram 52 of rectangular cross-section and a lip seal 54 bisecting actuating chamber 24 into an upper working chamber 56 and a lower chamber 58. Ram 52 is preferably made of spring steel of width approximately that of actuation chamber 24. In a relaxed state, ram 52 has a generally arcuate shape corresponding to the arcuate shape of actuating chamber surface 26 with a forward extending tang 53 which engages the die assembly 68 of the sheet material forming tool 10 as will be described. Seal 54 is formed of a suitable elastomeric material and is disposed above ram 52 adjacent upper chamber 56. As will be observed in FIGS. 1 and 2, seal 54 remains adjacent ram 52 and unexpanded throughout the movement of ram 52. Seal 54 has forward and rearward upwardly extending flanges 60 and 62 which seal against upper surface 26 of actuating chamber 24. Side sealing flanges 64 and 66 seal against side surfaces 28 and 30 of actuating chamber 26, respectively.

At the forward end of actuation chamber 24 there is a transitional surface 72 where arcuate upper surface 26 becomes a horizontal surface substantially parallel to the longitudinal axis of body 12. Transitional surface 72 is radiused to ensure flange 60 remains in sealing contact with surface 72 as ram 52 straightens under pressure. As best seen in FIG. 6, tang 53 extends substantially parallel to transitional surface 72 and extends into a slot 70 formed in slide block 74 of die assembly 68. Tang 53, and therefore ram 52, are secured to slide block 74 by pin 76. In operation, forward surface 77 of tang 53 bears against slide block 74 to transfer force.

Slide block 74 is connected via adjusting screw 78 to tooling block 80 of die assembly 68. Set screw 82 bears against adjusting screw 78 thereby preventing its rotation and thus maintaining the relationship of tooling block 80 to slide block 74 (FIG. 3). With reference to FIG. 4, slide block 74 and tooling block 80 have ribs 73 and 75 (shown only for tooling block 80 in FIG. 4) which also engage grooves 36 in side surfaces 28 and 30 thus retaining slide block 74 and tooling block 80 to body 12.

As best seen in FIG. 6, forming die assembly 84 is received within a stepped recess 86 in tooling block 80 and is retained in place by screw 88 and dowel 90. The remaining portions of die assembly 68 include punch and stripper assembly 92 secured to anvil 14 by screw 94. As described in greater detail in the aforementioned U.S. patents, die assembly 68 is operable to plastically deform and thereby join a number of sheets of material upon translational movement of forming die assembly 84 relatively towards punch and stripper assembly 92.

With reference to FIG. 7 and 3, at the rearward end of forming tool 10, are a pair of longitudinal passages 96 formed in cover 32. Passages 96 communicate fluid within lower chamber 58 to a pair of mufflers 102 via vertical bores 98, larger transverse bore 100 and connecting bores 104. Mufflers 102 are standard bronze air silencing type and are connected to body 12 in fluid communication with connecting bores 104 by threaded bores 106.

The operation of the force generating mechanism will now be described in detail with reference to FIGS. 1 and 2. Upon actuation of forming tool 10 by depressing valve 46, stem 116 moves away from seat 118 and seals against seat 120. High pressure air is communicated through perforation 128 in diaphragm 126 around seat 118 and via bores 42 and 44 to upper working chamber 56. The high pressure air then bears against ram 52 causing a downward deflection. Downward translational movement of the forward and rearward ends 108 and 110, respectively, of ram 52 is prevented by cover 32 and thus forward end 108 is caused to move longitudinally within actuating chamber 24. Longitudinal movement of the rearward end 110 of ram 52 is limited by the length of actuating chamber 24. In operation, rearward end 112 of ram 52 bears against key surface 113. Continued deflection of ram 52 under air pressure thus causes translational movement of forward end 108 of ram 52 and thus movement of tooling block 80 and forming die assembly 84 towards punch and stripper assembly 92 (FIG. 2). Sheet material (not shown) inserted between forming die assembly 84 and punch and stripper assembly 92 prior to actuation of forming tool 10 is plastically deformed and joined as described in the aforementioned patents.

Since ram 52 has a relatively large surface as compared to a pneumatic cylinder, one will appreciate that a large downward force is exerted against upper surface of ram 52. This large downward force causes a large resultant force substantially aligned with the longitudinal axis of sheet material forming tool 10 at the forward end 108 of ram 52. Further, limiting translational movement of rearward end 110 of ram 52 provides a "togglelike" mechanical advantage, and thus a force multiplying effect at forward end 108 of ram 52 as compared to the net downward force bearing on the upper surface of ram 52.

Upon downward deflection of ram 52 within actuating chamber 32, fluid in lower chamber 58 is evacuated through passages 96 to mufflers 102 as described above. As shown in FIG. 2, in an actuated state, ram 52 is constrained, essentially flat, against cover 32 under air pressure. As best seen in FIG. 6, when pressure is released from actuation button 114 of valve 46, stem 116 moves upwardly sealing against lower seat 118. Concomitantly, stem 116 moves away from upper seat 120. As ram 52 begins to return to its relax state, fluid in actuation chamber 24 is allowed to move pass upper seat 120 and through perforation 122 formed in upper diaphragm 124. Thus, upper chamber 56 is evacuated upon deactivation of forming tool 10 and ram 52 is allowed to return to its relaxed state.

As ram 52 returns to its relaxed, arcuate shape, forward end 108 of ram 52 retracts longitudinally. In this manner, forming die assembly 84 is retracted away from punch and stripper assembly 92 and the tool may be removed from the workpiece. It should be appreciated that die assembly 68 may be replaced with resistance welding electrodes, clamping jaws or other tooling to accomplish a variety of tasks. It is also possible to mount a number of force generating units equipped with appropriate tooling to create a work fixture into which a workpiece may be inserted and a number of operations performed simultaneously.

While it is apparent that the preferred embodiments of the invention disclosed are well calculated to provide the advantages and features above stated, it will be appreciated that the invention is susceptible to modification, variation, and change without departing from the proper scope or fair meaning of the subjoined claims.

I claim:

1. A force generating mechanism comprising:
a body having walls defining an elongated longitudinally extending chamber;
means for closing said chamber;
an elongated longitudinally extending resilient ram disposed within said chamber, said ram having a non-planar arcuate shape in a relaxed state and having first and second ends, said ram being movable transversely in said chamber;
a seal member disposed within said chamber adjacent said ram for sealing said ram with respect to the walls of said chamber when said ram moves transversely therein, said seal member being separate from said means for sealing said chamber;
means for fastening tooling to said second end of said ram; and
means for selectively pressurizing and depressurizing said chamber on one side of said ram whereupon pressurizing said chamber causes said ram and said seal member to deflect in a transverse direction towards a planar flattened condition, whereby said ends of said ram are caused to move in a longitudinal direction with respect to one another to generate a longitudinal working force at said second end of said ram for actuating said tooling, and whereupon said ram automatically returns from a substantially planar unrelaxed state having said flattened condition to said relaxed non-planar arcuate shape to retract said tooling when said chamber is depressurized.

2. The force generating mechanism of claim 1 further comprising stop means for limiting translation of said first end of said ram so that said working force is generated at said second end.

3. The force generating mechanism of claim 2 wherein said means for connecting tooling to said second end of said ram comprises a tang portion formed integral to said ram for engaging the tooling to be connected.

4. The force generating mechanism of claim 1 wherein said chamber has a width, and said resilient ram has a width which is slightly smaller than that of said chamber.

5. The force generating mechanism of claim 1 wherein said means for depressurizing further comprises valve means for depressurizing said chamber so that said ram can return to its normal relaxed state having said arcuate shape.

6. A force generating mechanism comprising:
a body having walls defining a longitudinally extending chamber;
a resilient ram disposed within said chamber, said ram having a non-planar shape when in a relatively relaxed state and first and second ends, said ram dividing the chamber into a first working chamber and a second working chamber and being movable transversely in said chamber;
fastening means for fastening tooling to said second end of said ram for reciprocating movement substantially in a plane of said ends of said ram;
sealing means for sealing the first working chamber from the second working chamber; and
means for selectively pressurizing and depressurizing said first working chamber whereupon pressurizing said first working chamber causes said ram to deflect in a transverse direction toward a substantially planar shape whereby said ends of said ram move apart with respect to one another in a longitudinal direction in said plane for actuating said tooling to move in said plane to engage a workpiece disposed in said plane, and whereupon depressurizing said first working chamber causes said ram to automatically return to said relatively relaxed state having said non-planar shape and automatically retract said tooling.

7. The force generating mechanism of claim 6 further comprising stop means for limiting translation of the first end of the ram such that a working force is generated at the second end.

8. The force generating mechanism of claim 6 wherein said fastening means for fastening tooling to the second end of said ram comprises a tang portion formed integral to said ram, said tang portion being adapted for engaging a slot formed in said tooling to be connected.

9. The force generating mechanism of claim 6 further comprising means for evacuating the second working chamber as the first working chamber is pressurized.

10. The force generating mechanism of claim 6 further comprising valve means for depressurizing the first working chamber whereby the resilient ram returns to its non-deflected state.

11. The force generating mechanism of claim 6 wherein said chamber has a width, and the resilient ram has a width which is slightly smaller in width than that of the chamber.

12. The force generating mechanism of claim 6 wherein said Sealing means Comprises a seal member disposed adjacent said ram and having flanged portions about its periphery for engaging and sealing to said walls of said chamber, said seal member having substantially the same shape of said ram in the non-deflected state, and wherein said seal member remains adjacent said ram and unexpanded upon pressurization of said working chamber.

13. The force generating mechanism of claim 6 further comprising evacuating means for evacuating the second working chamber as the first working chamber is pressurized, wherein said means for selectively pressurizing and depressurizing said first working chamber further includes a three-way valve for pressurizing and depressurizing said first working chamber.

* * * * *